United States Patent [19]
Johnson et al.

[11] Patent Number: 5,669,631
[45] Date of Patent: Sep. 23, 1997

[54] LIQUID PROPELLANT AIRBAG INFLATOR WITH AUTO INJECTION COMBUSTION CHAMBER

[75] Inventors: Darrin L. Johnson, Fountain Hills, Ariz.; L. John Pierotti, Huntsville, Utah

[73] Assignee: Morton International, Inc., Chicago, Ill.

[21] Appl. No.: 751,717

[22] Filed: Nov. 18, 1996

[51] Int. Cl.⁶ .................................................. B60R 21/26
[52] U.S. Cl. ............................ 280/741; 280/736; 280/737
[58] Field of Search ............................... 280/741, 736, 280/737, 742; 102/530, 531, 202; 222/3, 5

[56] References Cited

U.S. PATENT DOCUMENTS

| | | | |
|---|---|---|---|
| 4,116,466 | 9/1978 | Gehrig | 280/736 |
| 5,060,973 | 10/1991 | Giovanetti | 280/736 |
| 5,415,845 | 5/1995 | Brede et al. | 280/741 X |
| 5,441,302 | 8/1995 | Johnson et al. | 280/736 |
| 5,487,561 | 1/1996 | Mandzy et al. | 280/741 |
| 5,531,473 | 7/1996 | Rink et al. | 280/737 |

*Primary Examiner*—Christopher P. Ellis
*Attorney, Agent, or Firm*—George W. Rauchfuss, Jr.; Gerald K. White

[57] ABSTRACT

An improved liquid propellant airbag inflator including a tubular sidewall internally defining a combustion chamber and a propellant reservoir separated by a piston. A propellant injection port connecting the combustion chamber to the propellant reservoir is defined by a propellant guide surface of the tubular sidewall receiving the piston. According to one embodiment of the invention, the propellant injection port is provided in the form of a plurality of longitudinal grooves. According to another embodiment of the invention, an inner diameter of the propellant guide surface is larger than an outside diameter of the piston so that a gap, acting as the propellant injection port, is created between the propellant guide surface and the piston. The present invention also provides an improved liquid propellant airbag inflator including a tubular sidewall internally defining a combustion chamber and a propellant reservoir separated by a piston, wherein the sidewall defines a series of gas exhaust ports communicating with the combustion chamber. A cylindrical exhaust sleeve extends from the piston into the combustion chamber and seals the gas exhaust ports until the inflator is initiated and the piston is forced into the propellant reservoir. The present invention additionally provides an improved liquid propellant airbag inflator including a tubular sidewall internally defining a coolant reservoir, a combustion chamber and a propellant reservoir, with a propellant piston separating the propellant reservoir from the combustion chamber, and a coolant piston, independent from the propellant piston, separating the coolant reservoir from the combustion chamber.

43 Claims, 8 Drawing Sheets

LIQUID PROPELLANT AIRBAG INFLATOR WITH AUTO INJECTION COMBUSTION CHAMBER

FIELD OF THE INVENTION

The present invention relates to an airbag inflator and, more particularly, to a liquid propellant airbag inflator having an auto injection combustion chamber.

BACKGROUND OF THE INVENTION

An airbag module is employed in an automobile for protecting an occupant against injury by deploying an inflated airbag cushion to physically restrain the occupant's body when the automobile encounters a collision. An airbag inflator produces inflation gas for inflating the airbag cushion.

Some existing airbag inflators produce inflation gas from an exothermic reaction of stored liquid propellant. One such liquid propellant airbag inflator is disclosed in U.S. Pat. No. 5,487,561 to Mandzy et al., which shows an airbag inflator internally defining a combustion chamber and a propellant reservoir separated by a piston. Upon initiation of the airbag inflator, an initiator within the combustion chamber ignites and forces the piston against liquid propellant contained in the propellant reservoir. The liquid propellant is in turn forced through a propellant injection port defined by the piston into the combustion chamber. Once in the combustion chamber, the liquid propellant is ignited by the initiator and produces inflation gas further pressurizing the combustion chamber to continue forcing the piston into the propellant chamber. The inflator in effect has an auto injection combustion chamber creating a self-sustaining combustion, with the inflation gas eventually exiting the combustion chamber through inflation gas exhaust ports for inflating an airbag cushion.

A liquid propellant inflator as shown and disclosed by Mandzy et al. provides the benefit of operating at lower internal pressures than many of the prior art liquid propellant inflators. The lower operating pressures allow the use of lighter and smaller liquid propellant inflators. There is a need, however, for an improved liquid propellant airbag inflator having an auto injection combustion chamber with means for providing a more controlled, efficient and predictable rate of combustion within the auto injection combustion chamber in order to improve the performance of the inflator.

SUMMARY OF THE INVENTION

A general object, therefore, of the present invention is to provide an improved liquid propellant airbag inflator.

A more specific object of the present invention is to provide an improved liquid propellant airbag inflator having an auto injection combustion chamber.

Another object of the present invention is to provide an improved liquid propellant airbag inflator having means for producing a more controlled, efficient and predictable rate of combustion within the auto injection combustion chamber.

In carrying out this invention, there is provided a liquid propellant airbag inflator for inflating an airbag cushion in an airbag module. The airbag inflator includes an inflator housing, and a propellant piston slidingly received within and internally dividing the inflator housing into a combustion chamber and a propellant reservoir. At least one inflation gas exhaust port communicates with the combustion chamber. Liquid propellant is contained within the propellant reservoir, and at least one propellant injection port connects the combustion chamber and the propellant reservoir, with the at least one propellant injection port being defined by the inflator housing. Propellant plug means prevents the liquid propellant from flowing through the at least one propellant injection port until the propellant piston moves towards the liquid propellant. The inflator also includes initiating means for forcing the propellant piston against the liquid propellant, so that the propellant piston breaches the propellant plug means and causes the liquid propellant to be injected into the combustion chamber through the propellant injection port. The initiating means is also for igniting the liquid propellant upon entering the combustion chamber.

According to one aspect of the present invention, the propellant piston is slidingly received by a propellant piston guide surface of the inflator housing, and the at least one propellant injection port is in the form of at least one longitudinal groove defined by the propellant piston guide surface. According to a more specific aspect of the present invention, the at least one longitudinal groove comprises a plurality of longitudinal grooves.

According to a further aspect of the present invention, the plurality of longitudinal grooves have varying lengths. The varying lengths of the grooves provides the inflator with a progressive rate of injection of liquid propellant into the combustion chamber.

According to another aspect of the present invention, the propellant piston is slidingly received by a propellant piston guide surface of the inflator housing. The propellant piston has an outside diameter that is smaller than an inside diameter of the propellant piston guide surface of the sidewall of the inflator housing. A gap between the propellant piston and the propellant piston guide surface acts as the at least one propellant injection port.

According to an additional aspect of the present invention, the inside diameter of the propellant piston guide surface varies so that the gap between the propellant piston and the propellant piston guide surface varies as the propellant piston moves into the propellant reservoir. The varying gap provides the inflator with a progressive rate of injection of liquid propellant into the combustion chamber.

Another liquid propellant airbag inflator according to the present invention is provided. The airbag inflator includes an inflator housing, a propellant piston slidingly received within the inflator housing, and a coolant piston slidingly received within the inflator housing spaced-apart from the propellant piston.

A combustion chamber is defined by the inflator housing, the propellant piston and the coolant piston, and at least one inflation gas exhaust port communicates with the combustion chamber. A propellant reservoir is defined by the inflator housing and the propellant piston. Liquid propellant is contained within the propellant reservoir and at least one propellant injection port connects the combustion chamber and the propellant reservoir. Propellant plug means prevents the liquid propellant from flowing through the at least one propellant injection port until the propellant piston moves towards the liquid propellant. A coolant reservoir is defined by the inflator housing and the coolant piston, coolant is contained in the coolant reservoir, and at least one coolant injection port communicates with the coolant reservoir.

The airbag inflator also includes initiating means for forcing the coolant piston against the coolant to force the coolant through the coolant injection port, and for forcing the propellant piston against the liquid propellant to breach the propellant plug means and cause the liquid propellant to be injected into the combustion chamber through the propellant injection port. The initiating means is also for igniting the liquid propellant upon entering the combustion chamber. Providing a coolant piston that is separate from the propellant piston allows an additional means of controlling the rate of combustion within the combustion chamber.

An additional liquid propellant airbag inflator according to the present invention is provided. The airbag inflator includes an inflator housing and a piston slidingly received within the inflator housing and internally dividing the inflator housing into a combustion chamber and a propellant reservoir. Liquid propellant is contained within the propellant reservoir, and at least one propellant injection port connects the combustion chamber and the propellant reservoir. Propellant plug means prevents the liquid propellant from flowing through the at least one propellant injection port until the piston moves towards the liquid propellant. The airbag inflator also includes initiating means for forcing the piston against the liquid propellant, thereby breaching the propellant plug means and causing the liquid propellant to be injected into the combustion chamber through the propellant injection port, and for igniting the liquid propellant upon entering the combustion chamber.

At least one inflation gas exhaust port is defined by the inflator housing transversely to and communicating with the combustion chamber. A cylindrical exhaust sleeve extends from the piston into the combustion chamber and substantially seals the at least one inflation gas exhaust port until the piston moves towards the propellant reservoir.

According to one aspect of the present invention, the at least one gas exhaust port comprises a series of gas exhaust ports, so that the exhaust sleeve in combination with the series of gas exhaust ports provides an increasing rate of exhaust from the combustion chamber. According to another aspect of the present invention, the series of gas exhaust ports have varying sizes. According to an additional aspect of the present invention, the series of gas exhaust ports increase in size closer to the piston.

The invention together with further objects, features, advantages and aspects thereof, will be more clearly understood from the following description taken in connection with the accompanying drawings.

BRIEF DESCRIPTION OF THE DRAWINGS

The same reference numerals refer to the same elements throughout the various figures.

DETAILED DESCRIPTION OF THE INVENTION

Referring first to FIGS. 1 through 4, the present invention is directed to a liquid propellant airbag inflator 200 for providing inflation gas for inflating an airbag cushion as part of an airbag module. The airbag inflator 200 features a combustion chamber 236 and a propellant reservoir 243 connected by a plurality of longitudinal grooves 10,12,14,16 of varying lengths. The longitudinal grooves 10,12,14,16 provide the inflator 200 with a progressive rate of injection of liquid propellant 244 from the propellant reservoir 243 into the combustion chamber 236 as explained in greater detail below.

Figure 1:
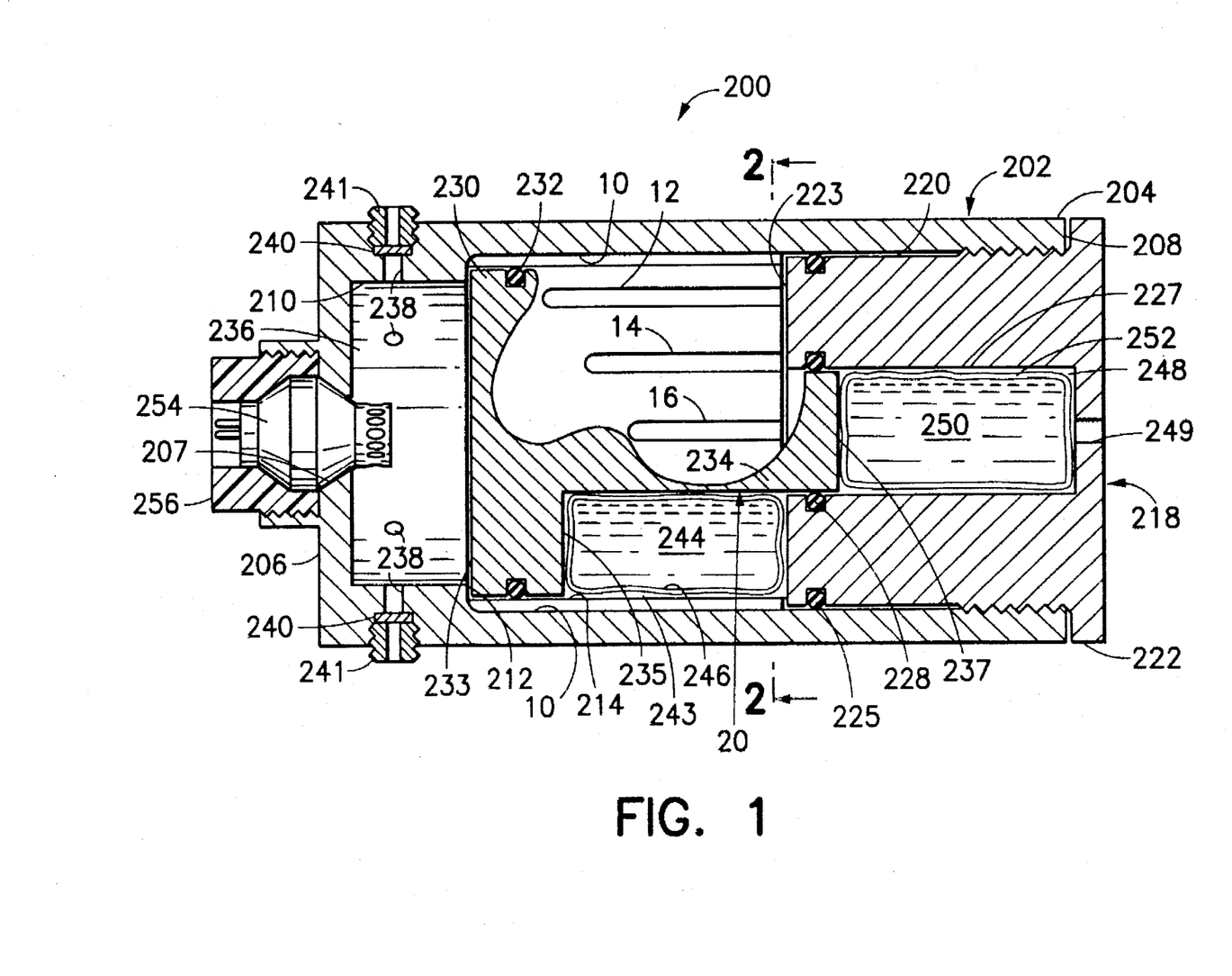
FIG. 1 is a side sectional view, partially cut-away, of a liquid propellant airbag inflator according to the present invention.

The inflator 200 includes an inflator housing 202 having an elongated, tubular sidewall 204 extending from a first endpiece 206 to an open end 208. An ignitor hole 207 is defined by the first endwall 206. A second endpiece 218 has an endwall 222 and a generally cylindrical sleeve 220 extending from the endwall to a distal end 223. The sleeve 220 is threadedly secured to the tubular sidewall 204 with the endwall 222 butting against the open end 208. The tubular sidewall 204 defines a cylindrical combustion surface 210 extending from the first endpiece 206 to a step 212, radially extending outwardly from the combustion surface, and a cylindrical propellant piston guide surface 214 extending from the step to the distal end 223 of the sleeve 220. The distal end 223 of the sleeve acts as an annular wall for the inflator housing 202, extending radially inwardly from the propellant piston guide surface, and the sleeve defines a cylindrical coolant piston guide surface 227 extending from the annular wall to the endwall 222.

The airbag inflator 200 includes a piston 20 having a cylindrical piston head 230 with a front face 233 and a rear face 235, and a cylindrical piston stem 234 axially and concentrically extending from the rear face of the piston head to a distal end 237. The piston head 230 acts as a propellant piston and is slidingly received by the propellant piston guide surface 214 of the tubular sidewall, with the front face 258 butting against the step 212. The piston stem 234 acts as a coolant piston and is slidingly received by the coolant piston guide surface 227 defined by the second endpiece 218.

The combustion chamber 236 is initially defined by the first endpiece 206, the combustion surface 210 and the front face 233 of the propellant piston 230. A plurality of gas exhaust ports 238 communicating with the combustion chamber 236 are radially defined by the inflator sidewall 204. A rupturable burst disk 240 sealing each of the inflation gas exhaust ports 238 is secured within each gas exhaust port by a hollow screw 241. The propellant reservoir 243, which is generally donut-shaped, is defined by the rear face 235 of the propellant piston 230, the propellant piston guide surface 214, the piston stem 234 and the annular wall 223, and is made substantially liquid-tight by o-rings 225,228,232. A suitable liquid propellant 244, such as a hydroxyl ammonium nitrate-based liquid monopropellant, is contained within a generally donut-shaped rupturable storage bag 264 positioned within the propellant reservoir 243.

A generally cylindrical coolant reservoir 248 is defined by the distal end 237 of the piston stem 234, the coolant piston guide surface 227 and the endwall 222, and the endwall defines a coolant injection port 249 communicating with the coolant reservoir. A suitable coolant 250 such as water (which can be treated with an antifreeze), argon or nitrogen for example, is contained within a cylindrical, rupturable storage bag 252 positioned within the coolant reservoir 248.

The propellant piston guide surface 214 of the sidewall 204 defines the plurality of elongated, longitudinal grooves 10,12,14,16 of varying length. The propellant reservoir 243 communicates with the combustion chamber 236 through the plurality of grooves 10,12,14,16 as the propellant piston 230 moves towards the second endpiece 218 to expose the grooves to the combustion chamber. As shown best in FIG. 3, the longest grooves 10 begin adjacent the annular wall 223 and extend to adjacent the step 212. The remaining grooves 12,14,16 have progressively shorter lengths and all begin adjacent the annular wall 223. Therefore, the longest grooves 10 supply liquid propellant 244 to the combustion chamber 236 upon initial movement of the propellant piston 230, and as the propellant piston moves further into the propellant reservoir 243 the remaining grooves 12,14,16 of varied, shorter lengths progressively become exposed to the combustion chamber so that the liquid propellant can also flow through those grooves into the combustion chamber. The progressive exposure of the additional shorter lengths of the grooves 10,12,14,16, therefore, increases the rate of injection as the propellant piston 230 moves into the propellant reservoir 243.

Figure 5:
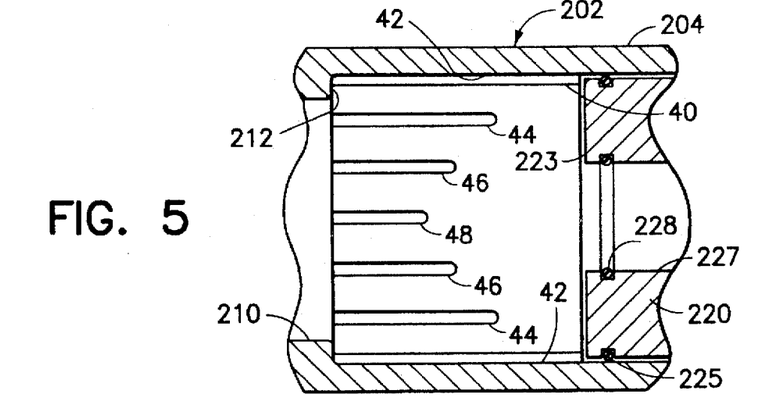
FIG. 5 is a sectional view of an alternative propellant piston guide surface of the airbag inflator of FIG. 1.
Figure 6:
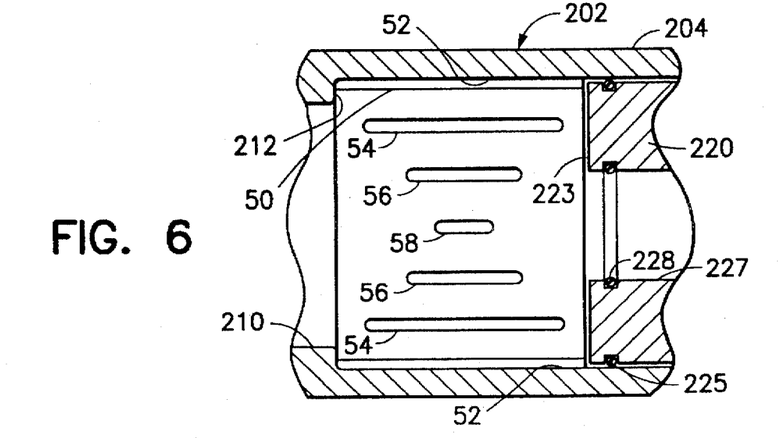
FIG. 6 is a sectional view of another alternative propellant piston guide surface of the airbag inflator of FIG. 1.

Alternatively, if a decreasing rate of injection is desired, the airbag inflator 200 can have an alternative propellant piston guide surface 40, as shown in FIG. 5, defining a plurality of grooves 42,44,46,48 of progressively shorter lengths, with all the grooves beginning adjacent the step 212. If an increasing and then decreasing rate of injection is desired, the airbag inflator 200 can have a further alternative propellant piston guide surface 50 defining a plurality of grooves 52,54,56,58 of progressively shorter lengths, with all the grooves centered between the step 212 and the annular wall 223, as shown in FIG. 6. Although not shown, a propellant piston guide surface of the airbag inflator 200 could also simply define just one longitudinal groove extending between the step 212 and the annular wall 223, or a plurality of longitudinal grooves of equal lengths to provide a constant rate of injection. Many variations may be employed. It should be noted that the step 212 acts as a first end of each of the propellent piston guide surfaces and the annular wall 223 acts as a second end of each of the propellent piston guide surfaces.

Figure 3:
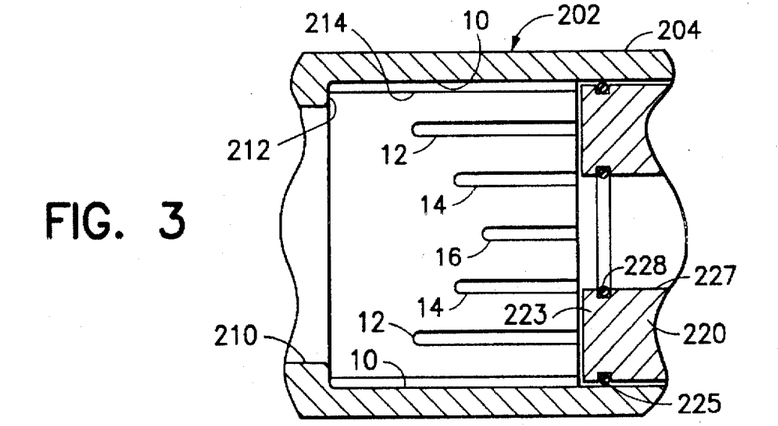
FIG. 3 is a sectional view of a propellant piston guide surface of the airbag inflator of FIG. 1.
Figure 4:
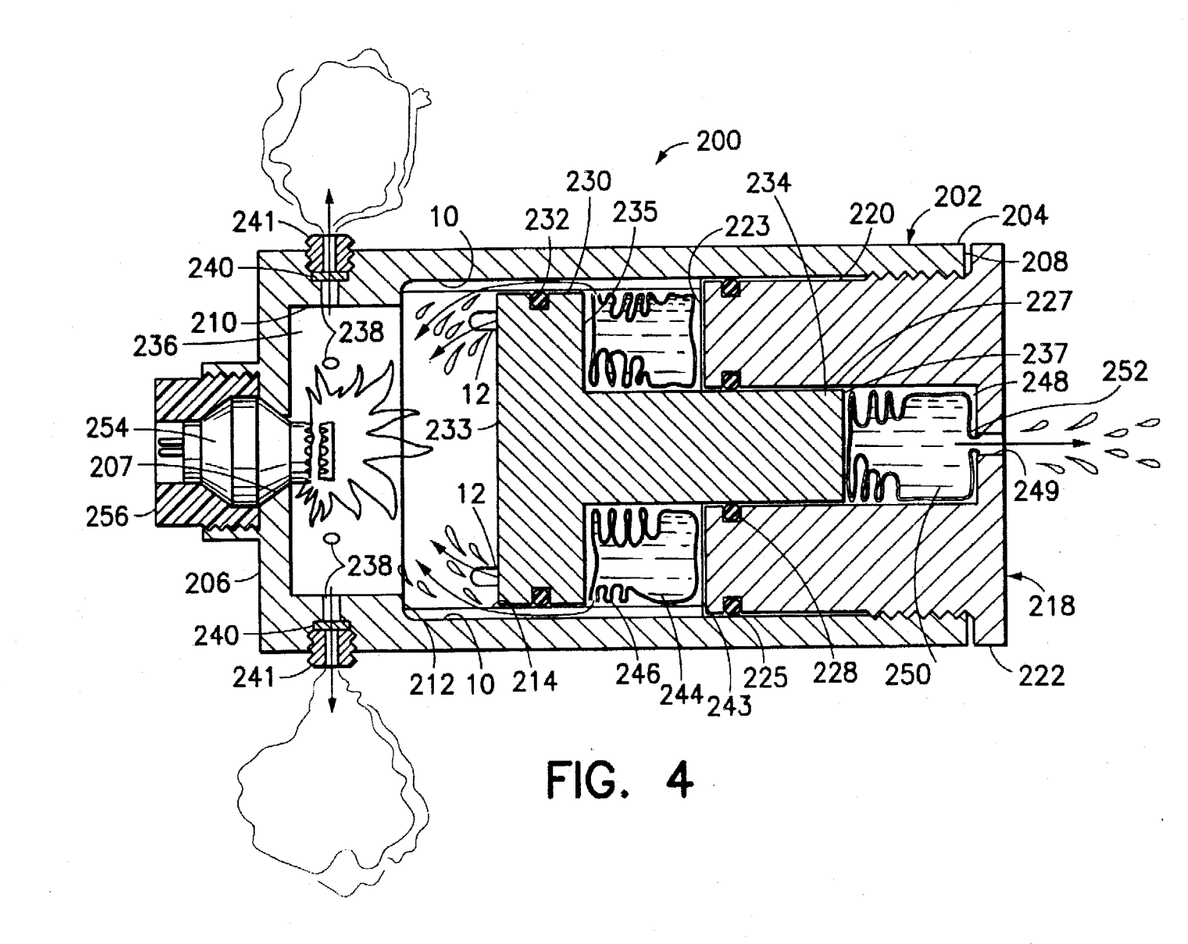
FIG. 4 is a side sectional view showing the airbag inflator of FIGS. 1 through 3 during operation.

An initiator 254 extends into the combustion chamber 236 through the ignitor bore 207 and is secured by an initiator cap 256. Referring to FIG. 3, upon initiation of the initiator 254, the initiator will burn rapidly to increase pressure within the combustion chamber 236 and force the propellant piston 230 against the liquid propellant 244, rupturing the rupturable storage bag 246 and forcing the liquid propellant to flow through the grooves 10,12,14,16. As the propellant piston 230 moves into the propellant reservoir 243, the size of the combustion chamber 236 increases with a portion of the propellant piston guide surface 214 exposed by the moving propellant piston helping to define the combustion chamber, while the size of the propellant reservoir decreases.

The grooves 10,12,14,16 act as nozzles to disperse the liquid propellant 66 in a spray of individual droplets within the combustion chamber 12. Upon entering the combustion chamber 236, the liquid propellant 244 is ignited by the initiator 254 to produce inflation gas. The increasing volume of inflation gas increases the pressure within the combustion chamber 236 and continues to force the propellant piston 230 through the propellant reservoir 243. The propellant piston 230 in turn forces the liquid propellant 244 to be injected into the combustion chamber 236 in one or more streams which produces a continuous, self-feeding combustion within the combustion chamber that continues after the initiator 254 has burned out. The rupturable burst disks 240 blocking the inflation gas exhaust ports 238 rupture when an operating pressure of about 5,000 psi is reached within the combustion chamber 236, allowing inflation gas to exit the inflator 200 for inflating an airbag cushion. The hollow screws 241 secured within the inflation gas exhaust ports 238 are sized to throttle the inflation gas so that the operating pressure remains at about 5,000 psi.

Simultaneous with the propellant piston 230 being forced against the liquid propellant 244, the coolant piston in the form of the piston stem 234 is forced against the coolant 250, rupturing the rupturable storage bag 252 and forcing the coolant to exit the coolant reservoir 248 through the coolant injection port 249. The coolant provides back pressure against the propellant piston 230 to help control the rate of injection of the liquid propellant 244 and as a by-product can be directed to mix with, and help cool, the inflation gas after leaving the inflator 200.

It is important to note that the burn rate of the initiator 254, the sectional size and lengths of the grooves 10,12,14,16, the size of the coolant injection port 249, the sizes of the gas exhaust ports 238, the viscosities of the coolant 250 and the liquid propellant 244, the composition of the liquid propellant and the strength of the rupturable storage bags 246,252 are variables which can be manipulated to control the rate of injection of the liquid propellant into the combustion chamber 236 and the resulting performance of the inflator 200.

Figure 7:
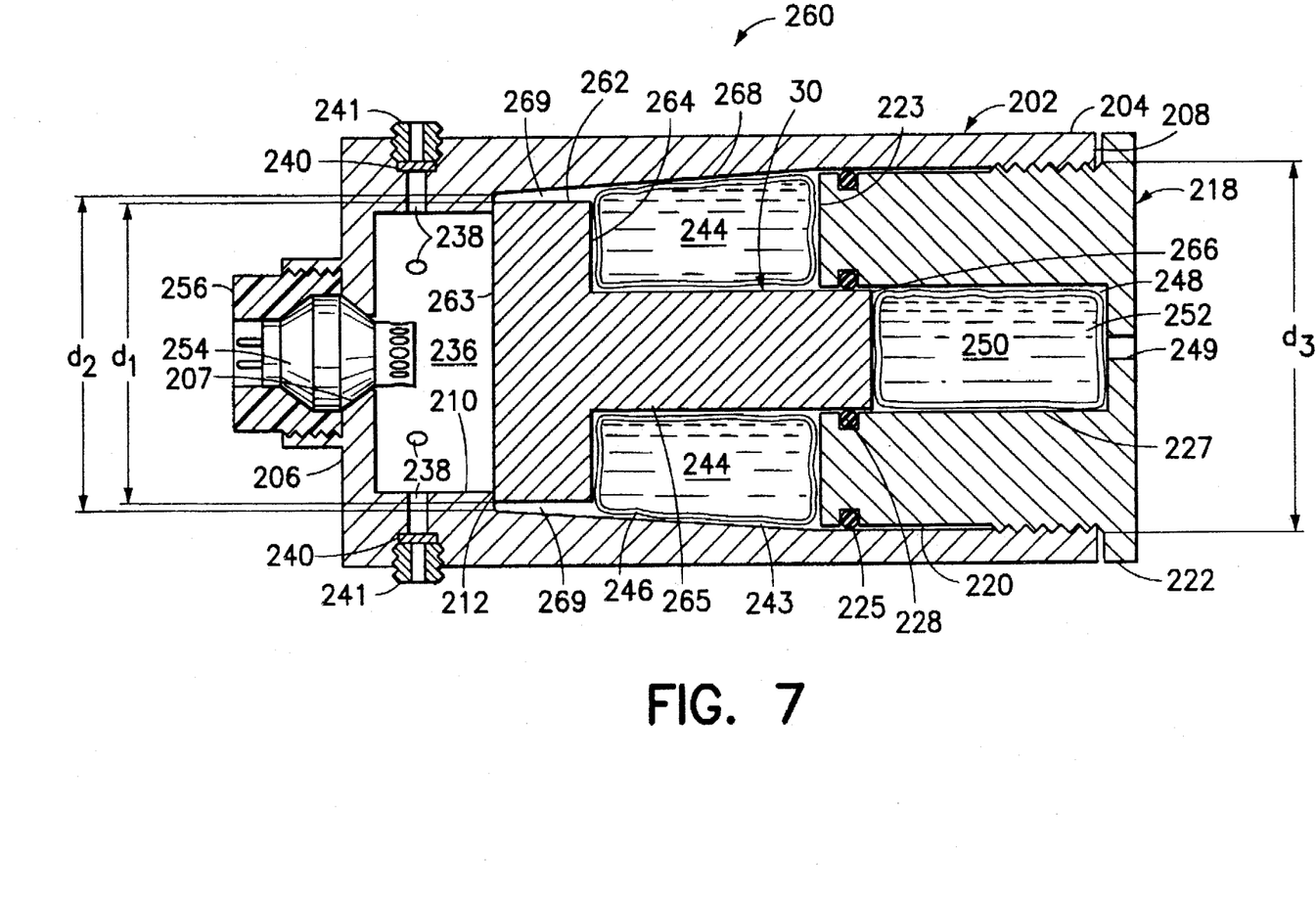
FIG. 7 is a side sectional view of another airbag inflator according to the present invention.
Figure 8:
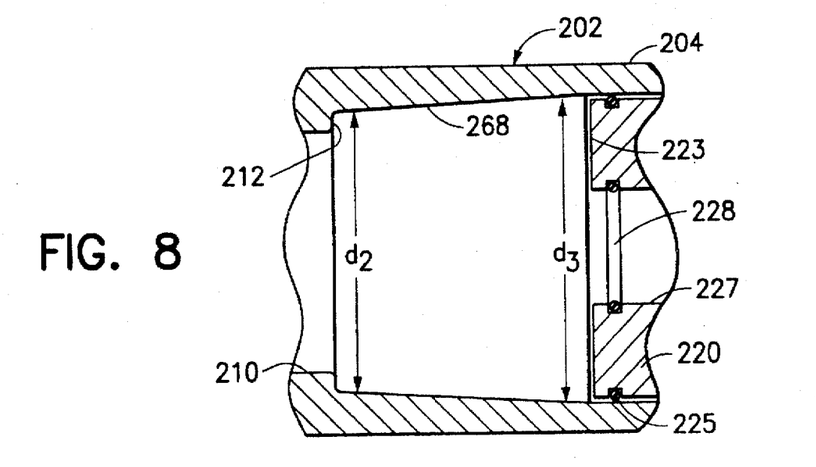
FIG. 8 is a sectional view of a propellant piston guide surface of the airbag inflator of FIG. 7.

Referring to FIGS. 7 and 8, another stored liquid propellant airbag inflator 260 according to the present invention is shown. The airbag inflator 260 is similar to the airbag inflator 200 of FIGS. 1 through 3, and parts of the airbag inflator 260 which are the same or perform the same or similar function as the parts of the airbag inflator 200 of FIGS. 1 through 3 have the same reference numeral.

Figure 2:
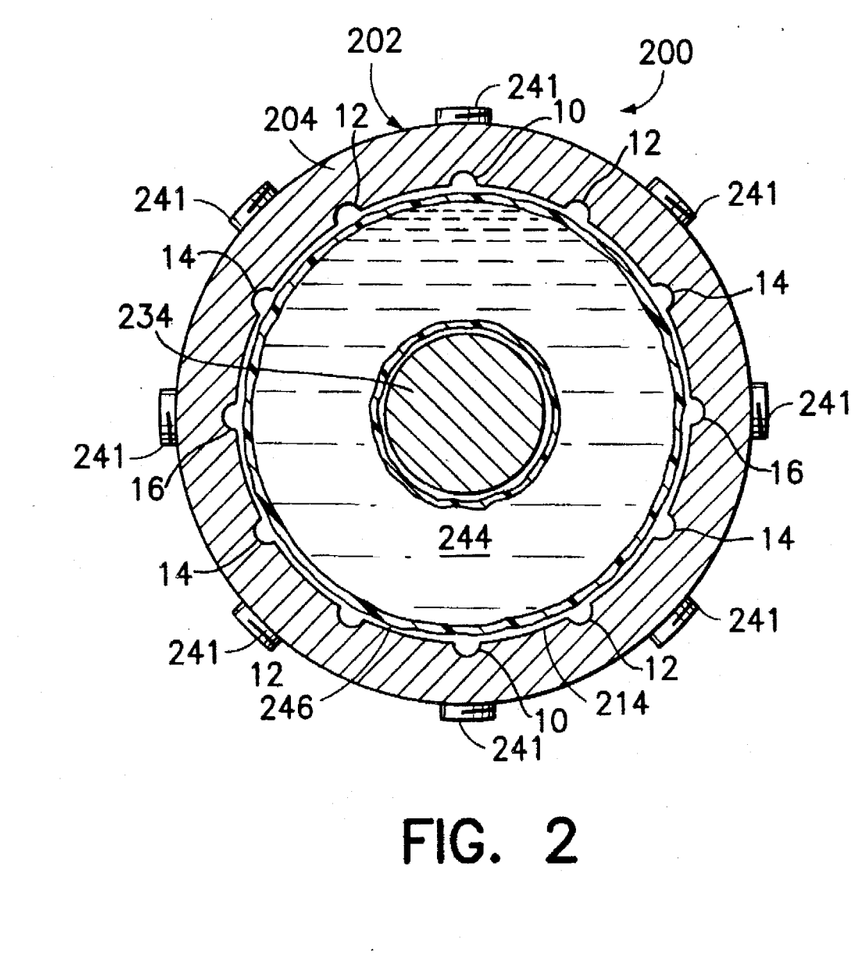
FIG. 2 is a sectional view of the airbag inflator of FIG. 1 taken along the line 2—2 of FIG. 1.

The airbag inflator 260 includes a piston 30 similar to the piston 20 of the airbag inflator 200 shown in FIGS. 1 through 3. The piston 30 includes a piston head 262 acting as a propellant piston and having a front face 263 and a rear face 264, and a piston stem 265 acting as a coolant piston and extending axially and concentrically from the rear face to a distal end 266. In place of the plurality of grooves 10,12, 14,16 of the airbag inflator 200, however, the propellant piston 262 is undersized with an outside diameter d1 of the propellant piston being smaller than an inside diameter d2 of a propellant piston guide surface 268 of the sidewall 204 located between the step 212 and the annular wall 223 so that a gap 269 is formed between the propellant piston guide surface and the propellant piston. The gap 269 acts as a propellant injection port. As shown best in FIG. 8, the propellant piston guide surface 268 has a smallest inside diameter d2 adjacent the step 212 increasing to a largest inside diameter d3 adjacent the annular wall 223 so that the gap 269 also increases as the propellant piston 262 moves into the propellant reservoir 243. The increasing gap 269 allows for a progressive and, more particularly, an increasing rate of injection of the liquid propellant 244 as the propellant piston 262 moves towards the annular wall 223. It will be appreciated that, because of the gap 269, the propellant piston 262 does not contact all of the propellant piston guide surface 268, and that the propellant piston also may not stay centered with a uniform gap surrounding it. However, if the propellant piston 262 moves to one side, the gap on the other side enlarges and the overall supply of propellant 244 is not affected. Thus, the propellant piston guide surface 268 does constrain the propellant piston 262 to a generally rearward path. Other than having different propellant injection ports, the airbag inflators 200 and 260 of FIGS. 1 through 4 operate alike.

Figure 9:
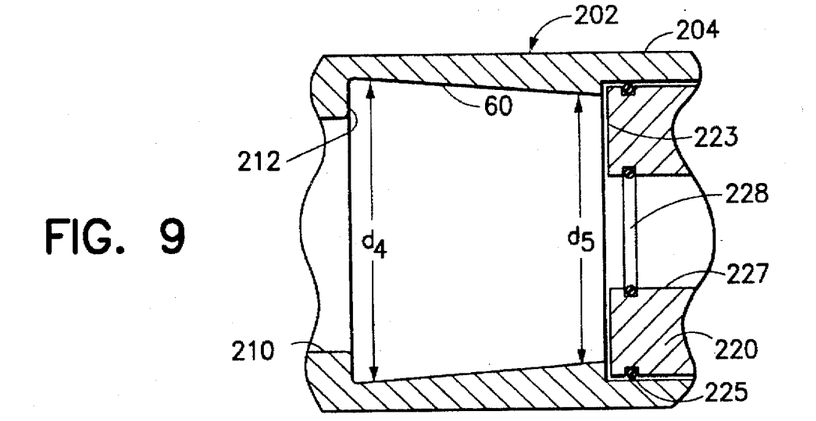
FIG. 9 is a sectional view of an alternative propellant piston guide surface of the airbag inflator of FIG. 7.
Figure 10:
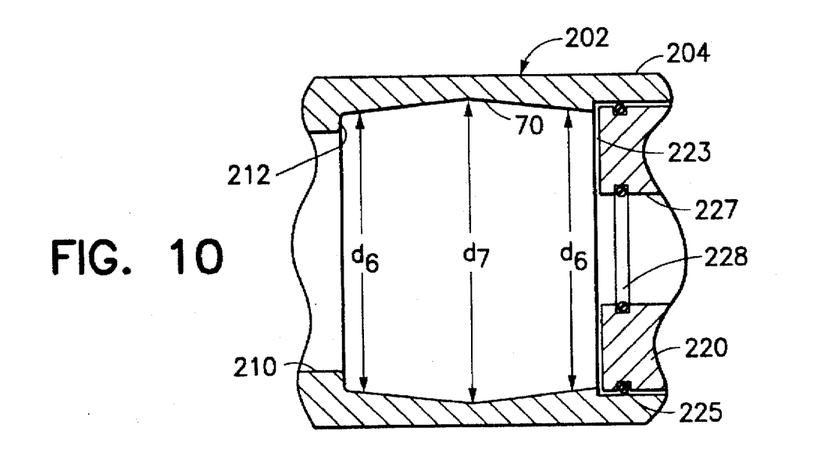
FIG. 10 is a sectional view of another alternative propellant piston guide surface of the airbag inflator of FIG. 7.

Alternatively, the airbag inflator 260 can include a propellant piston guide surface 60 having a largest inside diameter d4 adjacent the step 212 decreasing to a smallest inside diameter d5 adjacent the annular wall 223, as shown in FIG. 9, so that the gap 269 also decreases as the propellant piston 262 moves into the propellant reservoir 243. The airbag inflator 260 can also include a propellant piston guide surface 70 having a smallest inside diameter d6 adjacent the step 212 increasing to a largest inside diameter d7 between the step and the annular wall 223, and decreasing again to the smallest inside diameter d6 adjacent the annular wall, as shown in FIG. 10, so that the gap 269 also increases and then decreases as the propellant piston 262 moves into the propellant reservoir 243. Although not shown, a propellant piston guide surface of the airbag inflator 200 could also simply have an inside diameter that is the same between the step 212 and the annular wall 223 to provide a constant rate of injection. Many variations are possible.

Figure 11:
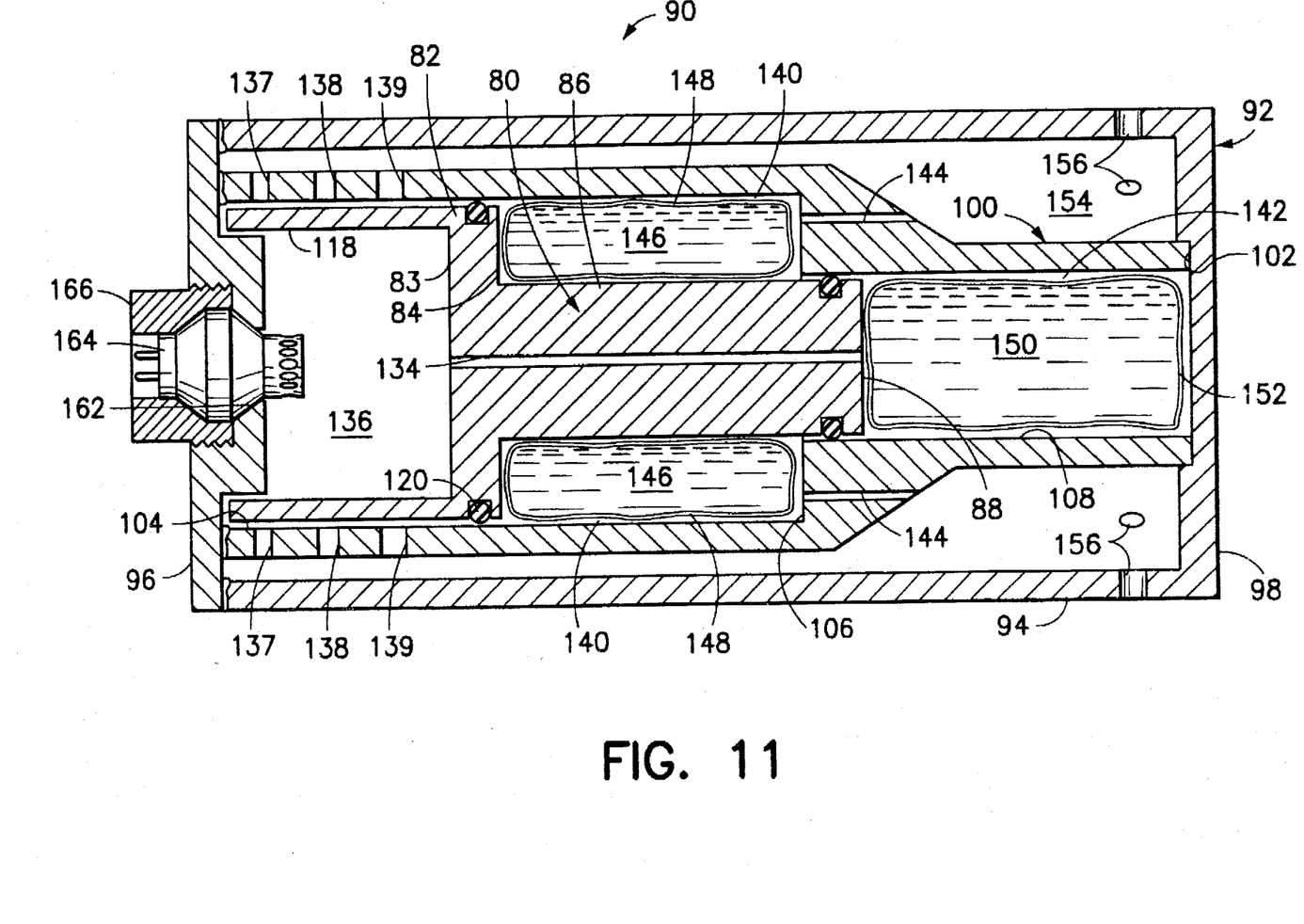
FIG. 11 is a side sectional view of an additional airbag inflator according to the present invention.

Referring to FIG. 11, an additional stored liquid propellant airbag inflator 90 according to the present invention is shown. In general, the inflator 90 features a combustion chamber 136 having a series of inflation gas exhaust ports 137,138,139 of varying sizes, and an exhaust sleeve 118 extending from a piston head 82 into the combustion chamber, sealing the gas exhaust ports prior to initiation of the inflator. Upon initiation of the inflator 90, the piston head 82 is forced away from the combustion chamber 136 and the exhaust sleeve 118 sequentially uncovers the gas exhaust ports 137,138,139 to provide a progressive rate of exhaust.

The airbag inflator 90 includes an inflator housing 92 having an elongated, tubular, external case 94 extending from a first endpiece 96 to a second endpiece 98. An elongated, generally tubular sidewall 100 is contained within the external case 94 concentrically with the external case and extends from the first endpiece 96 to a recess 102 in the second endpiece 98. The sidewall 100 defines a cylindrical coolant piston guide surface 104 extending from the first endpiece 96 to a step 106 extending radially inwardly from the coolant piston guide surface, and a propellant piston guide surface 108 extending from the step to the second endpiece 98.

The airbag inflator 90 includes a piston 80 having the cylindrical piston head 82 with a front face 83 and a rear face 84, and a cylindrical piston stem 86 axially and concentrically extending from the rear face of the piston head to a distal end 88. The piston head 82 acts as a coolant piston and is slidingly received by the coolant piston guide surface 104 between the first endpiece 96 and the step 106. The piston stem 86 acts as a propellant piston and is slidingly received by the propellant piston guide surface 108.

The combustion chamber 136 is cylindrical and defined by the first endpiece 96, the coolant piston guide surface 104 and the front face 83 of the coolant piston 82. A donut-shaped coolant reservoir 140 is defined by the rear face 84 of the coolant piston 82, the coolant piston guide surface 104, the step 106 and the piston stem 126, and a plurality of coolant injection ports 144 are defined by the sidewall 100. A cylindrical propellant reservoir 142 is defined by the distal end 88 of the piston stem 86, the propellant piston guide surface 108 and the recessed portion 102 of the second endpiece 98, and the combustion chamber 136 communicates with the propellant reservoir through a propellant injection port 134 axially and concentrically defined by the piston 116. O-rings 120,128 make the propellant reservoir 142 and coolant reservoir 140 substantially liquid-tight. A suitable coolant 146 is contained in a donut-shaped, rupturable storage bag 148 contained in the coolant reservoir 140, and a suitable liquid propellant 150 is contained in a cylindrical, rupturable storage bag 152 positioned within the propellant reservoir 142.

The sidewall 100 radially defines the series of inflation gas exhaust ports 137,138,139 communicating with the combustion chamber. The exhaust sleeve 118 extends concentrically from the front face 83 of the coolant piston 82 towards the first endpiece 96, generally fitting tightly within the coolant piston guide surface 104. The exhaust sleeve 118 extending from the coolant piston 116 and blocking the gas exhaust ports in a substantially liquid-tight manner acts as an inflation gas sealing means sealing the inflation gas exhaust ports 137,138,139 until a predetermined level of pressure is created within the combustion chamber 136 by increasing volume and temperature of inflation gas.

A mixing chamber 154 is defined by the first endpiece 96, the external case 94, the second endpiece 98 and the sidewall. The combustion chamber 136 communicates with the mixing chamber 154 through the plurality of inflation gas exhaust ports 137,138,139, and the coolant reservoir 140 communicates with the mixing chamber through the coolant injection ports 144. A plurality of mixed gas exhaust ports 156 are defined by the external case 94 adjacent the second endpiece 98.

An ignitor bore 162 extends through the first endpiece 96 and communicates with the combustion chamber 136, and an initiator 164 is secured in the ignitor bore 162 by an initiator cap 166. Upon initiation of the initiator 164, the initiator rapidly burns, increasing the pressure within the combustion chamber 136 and forcing the coolant piston 82 against the coolant and the piston stem 86 against the liquid propellant 150. The coolant piston 82 forced against the coolant 146 ruptures the rupturable storage bag 148 and forces the coolant through the coolant injection ports 144 into the mixing chamber 154. Simultaneously, the piston stem 86 forced against the liquid propellant 150 ruptures the rupturable storage bag 152 and forces the liquid propellant through the propellant injection port 134 into the combustion chamber 136. Upon entering the combustion chamber 136, the liquid propellant 150 is ignited by the initiator 164 to produce inflation gas. The increasing volume of inflation gas increases the pressure within the combustion chamber 136 and continues to force the coolant piston 82 through the remainder of the coolant reservoir 140 and the piston stem 86 through the remainder of the propellant reservoir 142. The piston stem 86 in turn forces the liquid propellant to be injected into the combustion chamber 136 in a generally consistent stream, which produces a continuous, self-feeding combustion within the combustion chamber that continues after the initiator 164 has burned out.

As the coolant piston 82 moves into the coolant reservoir 140, the exhaust sleeve 118 of the coolant piston first uncovers the inflation gas exhaust ports 137 closest to the first endpiece 96 allowing the inflation gas to exit the combustion chamber 136 and enter the mixing chamber 154. As the coolant piston 82 moves further into the coolant reservoir 140, the exhaust sleeve 118 progressively uncovers the remaining gas exhaust ports 138,139 so that the flow of inflation gas exiting the combustion chamber 136 increases. As shown, the inflation gas exhaust ports 137,138,139 can vary in size to further increase the flow of inflation gas. In particular, the exhaust ports 138 in the middle are larger in diameter than the exhaust ports 137 nearer the first endpiece 96, and the exhaust ports 139 furthest from the first endpiece are larger in diameter than the exhaust ports 138 in the middle, yet are ultimately sized to maintain an operating pressure of about 5,000 psi within the combustion chamber 136.

Once in the mixing chamber 154, the inflation gas mixes with the steady stream of coolant 146 being injected into the mixing chamber to cool the inflation gas. The mixed inflation gas and coolant then exit the inflator 90 through the mixed gas exhaust ports 156 for inflating an airbag cushion. The mixed gas exhaust ports 156 can be sized to regulate the flow of mixed inflation gas and coolant out of the inflator 90.

Figure 12:
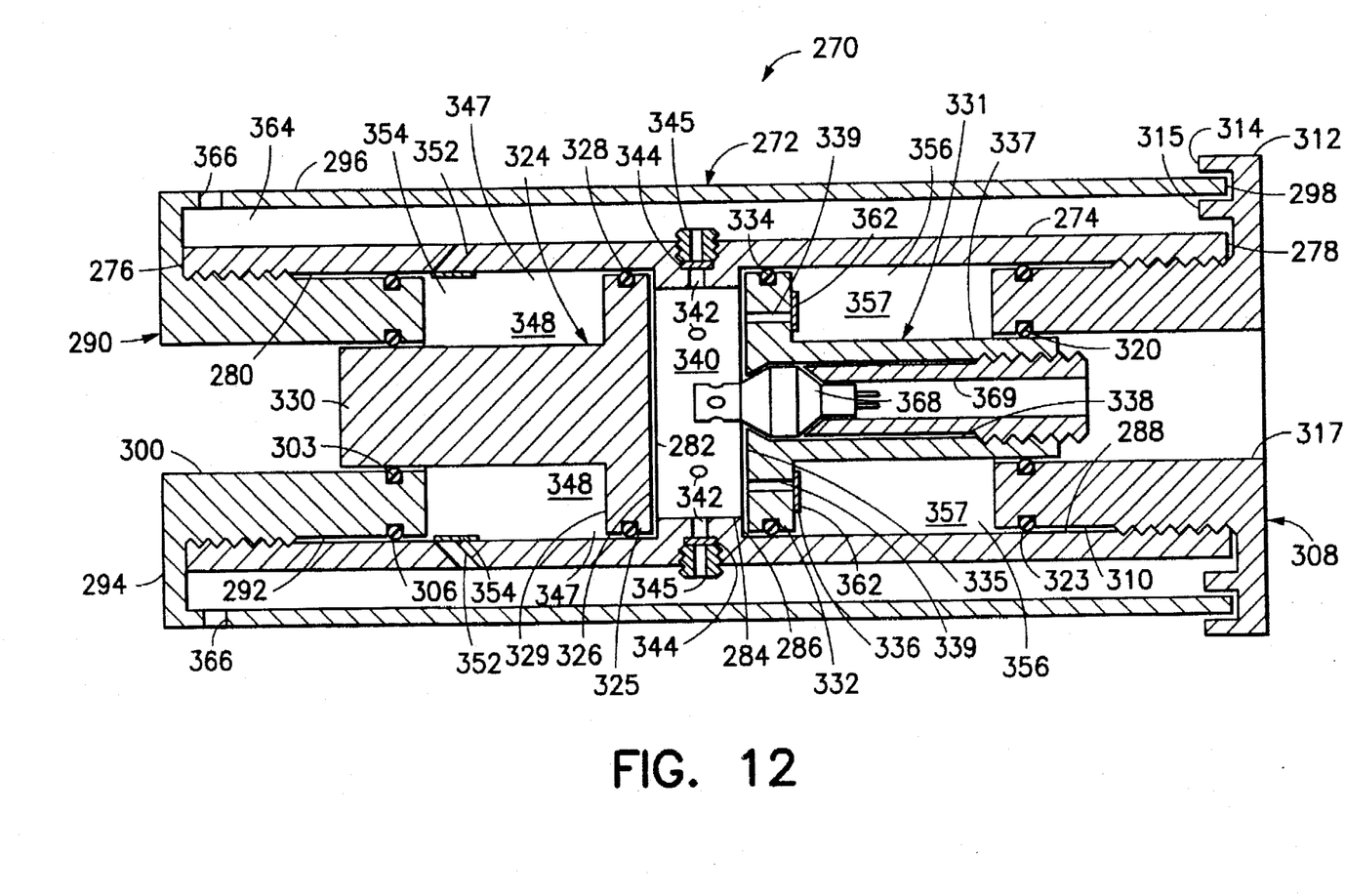
FIG. 12 is a side sectional view of a further airbag inflator according to the present invention.

Referring to FIG. 12, a further liquid propellant airbag inflator 270 according to the present invention is shown. The airbag inflator 270 features a coolant piston 325 that is separate from a propellant piston 332 of the inflator.

The airbag inflator 270 includes an inflator housing 272 comprising an elongated, tubular sidewall 274 extending from a first open end 276 to a second open end 278. A first endpiece 290 has a cylindrical outer side surface 292 and a flange 294 extending radially outwardly from the outer side surface. The outer side surface 292 is threadedly received by the tubular sidewall 274 to secure the first endpiece 290 to the sidewall, with the flange 294 butting against the first open end. An elongated, tubular external case 296 extends from the flange 294 of the first endpiece 290 to an open end 298, with the external case encircling the sidewall 274. A second endpiece 308 has a cylindrical outer side surface 310 and a flange 312 extending radially outwardly from the outer side surface. The outer side surface 310 is threadedly received by the sidewall 274 to secure the endpiece 308 to the sidewall, with the flange 312 butting against the second open end. The flange 312 of the second endpiece 308 includes circular ribs 314,315 for receiving the open end 298 of the external case 296 extending from the first endpiece 290. The second endpiece 308 defines a cylindrical bore 317.

The tubular sidewall 274 has a coolant piston guide surface 280 extending from the first endpiece 290 to a first step 282 extending radially inwardly from the coolant piston guide surface. A combustion surface 284 extends from the first step 282 to a second step 286 extending radially outwardly from the combustion surface, and a propellant piston guide surface 288 extends from the second step to the second endpiece 308.

The airbag inflator 270 includes a first piston 324 having a cylindrical piston head 325 with a front face 326 and a rear face 329, and a cylindrical piston stem 330 axially and concentrically extending from the rear face of the piston head. The piston head 325 acts as the coolant piston and is slidingly received by the coolant piston guide surface 280 with the front face 326 abutting the first step 282, and the piston stem 330 is slidingly received by the cylindrical bore 300 defined by the first endpiece 290. The airbag inflator 270 also includes a second piston 331 having a cylindrical piston head 332 with a front face 335 and a rear face 336, and a cylindrical piston stem 337 axially and concentrically extending from the rear face of the piston head. The piston head 332 acts as the propellant piston and is slidingly received by the propellant piston guide surface 288 with the front face 335 abutting the second step 286, and the piston stem 337 is slidingly received by the cylindrical bore 317 defined by the second endpiece 308. The second piston 331 axially and concentrically defines an ignitor hole 338, and the propellant piston 332 defines longitudinal propellant injection ports 339. Alternatively, the propellant injection ports could be defined by the propellant piston guide surface similar to the airbag inflators 200,260 of FIGS. 1 through 10.

A combustion chamber 340 is defined by the front face 326 of the coolant piston 325, the combustion surface 284 and the front face 335 of the propellant piston 332, and a plurality of inflation gas exhaust ports 342 communicating with the combustion chamber are radially defined by the inflator sidewall 274. A rupturable burst disk 344 is secured within each gas exhaust port 342 by a hollow screw 345. Alternatively, a cylindrical sleeve could extend from the front face of the propellant piston, similar to the airbag inflator 90 of FIG. 11 for covering the gas exhaust ports.

A generally donut-shaped coolant reservoir 347 is defined by the rear face 329 of the coolant piston 326, the coolant piston guide surface 280, the piston stem 330 and the first endpiece 290. The coolant reservoir 347 is made substantially liquid-tight by o-rings 303,306,328, and a suitable coolant 348 is contained within the coolant reservoir. The sidewall 274 defines coolant injection ports 352 and rupturable burst disks 354 block each coolant injection port in a substantially liquid-tight manner and prevent the coolant 348 from flowing through the coolant injection ports until a predetermined amount of pressure is applied to the coolant. Alternatively, the coolant plug means could be a rupturable storage bag for containing the coolant.

A generally donut-shaped propellant reservoir 356 is defined by the rear face 336 of the propellant piston 332, the propellant piston guide surface 288, the piston stem 337 and the second endpiece 308, and communicates with the combustion chamber 340 through the propellant injection ports 339. The propellant reservoir 356 is made substantially liquid-tight by o-rings 320,323,334, and a suitable liquid propellant 357 is contained within the propellant reservoir. Rupturable burst disks 362 block the injection ports in a substantially liquid-tight manner and prevent the liquid propellant 357 from flowing through the propellant injection ports 339 until a predetermined amount of pressure is applied to the liquid propellant. Alternatively, the propellant plug means could be a rupturable storage bag for containing the liquid propellant.

A mixing chamber 364 is defined by the sidewall 274, the first endpiece 290, the external casing 296 and the second endpiece 308, and a plurality of mixed gas exhaust ports 366 are defined by the external casing. An initiator 368 extends into the combustion chamber 340 through the ignitor hole 337 and is secured by an initiator cap 369. Upon initiation of the initiator 368, the initiator rapidly burns to create a sufficient amount of pressure within the combustion chamber 340 to force the propellant piston 332 against the liquid propellant 357 and the coolant piston 325 against the coolant 348. The coolant piston 325 forced against the coolant 348 ruptures the rupturable burst disks 354 and forces the coolant through the coolant injection ports 352 into the mixing chamber 364. The propellant piston 332 forced against the liquid propellant 357, ruptures the rupturable burst disks 362 and forces the liquid propellant through the propellant injection ports 339 and into the combustion chamber 340, and the liquid propellant is ignited by the initiator 368 to produce inflation gas. The increasing volume of inflation gas increases the pressure within the combustion chamber 340 and continues to force the coolant piston 325 through the remainder of the coolant reservoir 347 and the propellant piston 332 through the remainder of the propellant reservoir 356. The propellant piston 332 in turn forces the liquid propellant 357 to be injected into the combustion chamber 340 in a generally consistent stream. The rupturable burst disks 344 covering the inflation gas exhaust ports 342 eventually rupture and allow the inflation gas to enter the mixing chamber 364. Once in the mixing chamber 364, the inflation gas mixes with the steady stream of coolant 348 being injected into the mixing chamber to cool the inflation gas, with the mixed inflation gas and coolant exiting the inflator 270 through the mixed gas exhaust ports 366.

The airbag inflator 270 according to the present invention provides a coolant piston 325 that is separate from and, therefore, can move independently of the propellant piston 332. The viscosity of the coolant 348 can be used to regulate the movement of the coolant piston 325, which thereby in part regulates the ultimate pressure within the combustion chamber 340. The separate coolant piston 325, therefore, provides an additional means for controlling the combustion rate of the liquid propellant airbag inflator 270.

Since other changes and modifications varied to fit particular operating requirements and environments will be apparent to those skilled in the art, the invention is not considered limited to the examples chosen for purposes of illustration, and includes all changes and modifications which do not constitute a departure from the true spirit and scope of this invention as claimed in the following claims and equivalents thereto.

We claim:

1. A liquid propellant airbag inflator for inflating an airbag cushion in an airbag module, the airbag inflator comprising:

an inflator housing;

a propellant piston slidingly received within the inflator housing and internally dividing the inflator housing into a combustion chamber and a propellant reservoir;

at least one inflation gas exhaust port communicating with the combustion chamber;

liquid propellant contained within the propellant reservoir;

at least one propellant injection port connecting the combustion chamber and the propellant reservoir, the at least one propellant injection port defined by the inflator housing;

propellant plug means preventing the liquid propellant from flowing through the at least one propellant injection port until the propellant piston moves towards the liquid propellant; and initiating means for forcing the propellant piston against the liquid propellant, thereby breaching the propellant plug means and causing the liquid propellant to be injected into the combustion chamber through the propellant injection port, and for igniting the liquid propellant upon entering the combustion chamber.

2. An airbag inflator according to claim 1 wherein:

the propellant piston is slidingly received by a propellant piston guide surface of the inflator housing; and the at least one propellant injection port comprises at least one longitudinal groove defined by the propellant piston guide surface.

3. An airbag inflator according to claim 2 wherein the at least one longitudinal groove comprises a plurality of longitudinal grooves.

4. An airbag inflator according to claim 3 wherein the plurality of longitudinal grooves have varying lengths.

5. An airbag inflator according to claim 4 wherein the propellant piston is positioned adjacent a first end of the propellant piston guide surface prior to the initiating means forcing the propellant piston against the liquid propellant and towards a second end of the propellant piston guide surface, with the plurality of longitudinal grooves of varying lengths all beginning at said second end, whereby the plurality of longitudinal grooves of varying lengths provide an increasing rate of injection of liquid propellant as the propellant piston is forced towards said second end.

6. An airbag inflator according to claim 4 wherein the propellant piston is positioned adjacent a first end of the propellant piston guide surface prior to the initiating means forcing the propellant piston against the liquid propellant and towards a second end of the propellant piston guide surface, with the plurality of longitudinal grooves of varying lengths all beginning at said first end, whereby the plurality of longitudinal grooves of varying lengths provide a decreasing rate of injection of liquid propellant as the propellant piston is forced towards said second end.

7. An airbag inflator according to claim 4 wherein the propellant piston is positioned adjacent a first end of the propellant piston guide surface prior to the initiating means forcing the propellant piston against the liquid propellant and towards a second end of the propellant piston guide surface, with the plurality of longitudinal grooves of varying lengths all centered between said first end and said second end, whereby the plurality of longitudinal grooves of varying lengths provide an increasing and then a decreasing rate of injection of liquid propellant as the propellant piston is forced towards said second end.

8. An airbag inflator according to claim 1 wherein:

the propellant piston is slidingly received by a propellant piston guide surface of the inflator housing; and the propellant piston has an outside diameter that is smaller than an inside diameter of the propellant piston guide surface of the sidewall of the inflator housing, with the at least one propellant injection port comprising a gap between the propellant piston and the propellant piston guide surface.

9. An airbag inflator according to claim 8 wherein the inside diameter of the propellant piston guide surface varies so that the gap between the propellant piston and the propellant piston guide surface varies as the propellant piston moves into the propellant reservoir.

10. An airbag inflator according to claim 9 wherein the propellant piston is positioned adjacent a first end of the propellant piston guide surface prior to the initiating means forcing the propellant piston against the liquid propellant and towards a second end of the propellant piston guide surface, with the inside diameter of the propellant piston guide surface increasing between said first end and said second end, whereby the gap between the propellant piston and the propellant piston guide surface provides an increasing rate of injection of liquid propellant as the propellant piston is forced towards said second end.

11. An airbag inflator according to claim 9 wherein the propellant piston is positioned adjacent a first end of the propellant piston guide surface prior to the initiating means forcing the propellant piston against the liquid propellant and towards a second end of the propellant piston guide surface, with the inside diameter of the propellant piston guide surface decreasing between said first end and said second end, whereby the gap between the propellant piston and the propellant piston guide surface provides a decreasing rate of injection of liquid propellant as the propellant piston is forced towards said second end.

12. An airbag inflator according to claim 9 wherein the propellant piston is positioned adjacent a first end of the propellant piston guide surface prior to the initiating means forcing the propellant piston against the liquid propellant and towards a second end of the propellant piston guide surface, with the inside diameter of the propellant piston guide surface increasing and then decreasing between said first end and said second end, whereby the gap between the propellant piston and the propellant piston guide surface provides an increasing and then decreasing rate of injection of liquid propellant as the propellant piston is forced towards said second end.

13. An airbag inflator according to claim 1 further comprising:
- a coolant piston slidingly received within the inflator housing;
- a coolant reservoir defined internally within the inflator housing by the coolant piston and the inflator housing;
- at least one coolant injection port defined by the inflator housing communicating with the coolant reservoir; and
- coolant contained within the coolant reservoir;
- the initiating means also for forcing the coolant piston against the coolant to force the coolant through the at least one coolant injection port.

14. An airbag inflator according to claim 13 further comprising:
- a mixing chamber defined within the inflator housing communicating with the combustion chamber through the at least one inflation gas exhaust port and the coolant reservoir through the at least one coolant injection port; and
- at least one mixed gas exhaust port defined by the inflator housing and communicating with the mixing chamber.

15. An airbag inflator according to claim 13 wherein:
- the inflator housing comprises a first endpiece and an elongated sidewall extending from the first endpiece to a second endpiece, the sidewall defining a coolant piston guide surface extending from the second endpiece to an annular wall extending radially outwardly from the coolant piston guide surface and a propellant piston guide surface extending from the annular wall towards the first endpiece;
- the propellant piston is in the form of a piston head of a piston slidingly received by the propellant piston guide surface;
- the coolant piston is in the form of a piston stem of the piston axially and concentrically extending from the piston head and slidingly received by the coolant piston guide surface;
- the combustion chamber is defined by the first endpiece, the sidewall and the piston head;
- the propellant reservoir is defined by the piston head, the piston stem, the propellant piston guide surface and the annular wall; and
- the coolant reservoir is defined by a distal end of the piston stem, the coolant piston guide surface and the second endpiece.

16. An airbag inflator according to claim 15 wherein the at least one propellant injection port comprises at least one longitudinal groove defined by the propellant piston guide surface.

17. An airbag inflator according to claim 16 wherein the at least one longitudinal groove comprises a plurality of longitudinal grooves.

18. An airbag inflator according to claim 17 wherein the plurality of longitudinal grooves have varying lengths.

19. An airbag inflator according to claim 18 wherein each of the plurality of longitudinal grooves begins adjacent the annular wall and extends towards the combustion chamber.

20. An airbag inflator according to claim 18 wherein the propellant piston guide surface extends from the annular wall to a step extending radially inwardly from the propellant piston guide surface, and each of the plurality of longitudinal grooves begins adjacent the step.

21. An airbag inflator according to claim 18 wherein the propellant piston guide surface extends from the annular wall to a step extending radially inwardly from the propellant piston guide surface, and each of the plurality of longitudinal grooves is centered between the step and the annular wall.

22. An airbag inflator according to claim 15 wherein the piston head has an outside diameter that is smaller than an inside diameter of the propellant piston guide surface, with the at least one propellant injection port comprising a gap between the piston head and the propellant piston guide surface.

23. An airbag inflator according to claim 22 wherein the inside diameter of the propellant piston guide surface varies so that the gap between the piston head and the propellant piston guide surface varies as the piston head moves into the propellant reservoir.

24. An airbag inflator according to claim 23 wherein the propellant piston guide surface extends from the annular wall to a step extending radially inwardly from the propellant piston guide surface, and the inside diameter of the propellant piston guide surface increases between the step and the annular wall so that the gap between the piston head and the propellant piston guide surface increases as the piston head moves into the propellant reservoir.

25. An airbag inflator according to claim 23 wherein the propellant piston guide surface extends from the annular wall to a step extending radially inwardly from the propellant piston guide surface, and the inside diameter of the propellant piston guide surface decreases between the step and the annular wall so that the gap between the piston head and the propellant piston guide surface decreases as the piston head moves into the propellant reservoir.

26. An airbag inflator according to claim 23 wherein the propellant piston guide surface extends from the annular wall to a step extending radially inwardly from the propellant piston guide surface, and the inside diameter of the propellant piston guide surface increases and then decreases between the step and the annular wall so that the gap between the piston head and the propellant piston guide surface increases and then decreases as the piston head moves into the propellant reservoir.

27. An airbag inflator according to claim 13 wherein:
- the inflator housing comprises an elongated sidewall extending from a first endpiece to a second endpiece;
- the coolant piston is slidingly received by a coolant piston guide surface of the sidewall extending from the first endpiece;
- the coolant reservoir is defined by the first endpiece, the coolant piston guide surface and the coolant piston;
- the propellant piston is spaced-apart from the coolant piston and slidingly received by a propellant piston guide surface of the sidewall extending from the second endpiece;
- the propellant reservoir is defined by the propellant piston, the propellant piston guide surface and the second endpiece; and
- the combustion chamber is defined by the coolant piston, the sidewall and the propellant piston.

28. An airbag inflator according to claim 27 wherein the at least one propellant injection port comprises at least one longitudinal groove defined by the propellant piston guide surface of the sidewall of the inflator housing.

29. An airbag inflator according to claim 28 wherein the at least one longitudinal groove comprises a plurality of longitudinal grooves.

30. An airbag inflator according to claim 29 wherein the plurality of longitudinal grooves have varying lengths.

31. An airbag inflator according to claim 27 wherein the propellant piston has an outside diameter that is smaller than an inside diameter of the propellant piston guide surface, with the at least one propellant injection port comprising a gap between the propellant piston and the propellant piston guide surface.

32. An airbag inflator according to claim 31 wherein the inside diameter of the propellant piston guide surface varies so that the gap between the propellant piston and the propellant piston guide surface varies as the propellant piston moves into the propellant reservoir.

33. A liquid propellant airbag inflator for inflating an airbag cushion in an airbag module, the airbag inflator comprising:

a inflator housing;

a propellant piston slidingly received within the inflator housing;

a coolant piston slidingly received within the inflator housing spaced-apart from the propellant piston;

a combustion chamber defined by the inflator housing, the propellant piston and the coolant piston;

at least one inflation gas exhaust port communicating with the combustion chamber;

a propellant reservoir defined by the inflator housing and the propellant piston;

liquid propellant contained within the propellant reservoir;

at least one propellant injection port connecting the combustion chamber and the propellant reservoir;

propellant plug means preventing the liquid propellant from flowing through the at least one propellant injection port until the propellant piston moves towards the liquid propellant;

a coolant reservoir defined by the inflator housing and the coolant piston;

coolant contained in the coolant reservoir;

at least one coolant injection port communicating with the coolant reservoir; and initiating means for forcing the coolant piston against the coolant to force the coolant through the coolant injection port, and for forcing the propellant piston against the liquid propellant to breach the propellant plug means and cause the liquid propellant to be injected into the combustion chamber through the propellant injection port, and for igniting the liquid propellant upon entering the combustion chamber.

34. An airbag inflator according to claim 33 further comprising:

a mixing chamber defined within the inflator housing communicating with the combustion chamber through the at least one inflation gas exhaust port and the coolant reservoir through the at least one coolant injection port; and at least one mixed gas exhaust port defined by the inflator housing and communicating with the mixing chamber.

35. An airbag inflator according to claim 33 wherein:

the at least one inflation gas exhaust port is defined by the inflator housing transversely to the combustion chamber; and a cylindrical exhaust sleeve extends from the piston into the combustion chamber and substantially seals the at least one inflation gas exhaust port until the piston moves towards the propellant reservoir.

36. An airbag inflator according to claim 35 wherein the at least one gas exhaust port comprises a series of gas exhaust ports.

37. An airbag inflator according to claim 36 wherein the series of gas exhaust ports have varying sizes.

38. A liquid propellant airbag inflator comprising:

an inflator housing;

a piston slidingly received within the inflator housing and internally dividing the inflator housing into a combustion chamber and a propellant reservoir;

liquid propellant contained within the propellant reservoir;

at least one propellant injection port connecting the combustion chamber and the propellant reservoir;

propellant plug means preventing the liquid propellant from flowing through the at least one propellant injection port until the piston moves towards the liquid propellant;

initiating means for forcing the piston against the liquid propellant, thereby breaching the propellant plug means and causing the liquid propellant to be injected into the combustion chamber through the propellant injection port, and for igniting the liquid propellant upon entering the combustion chamber; and at least one inflation gas exhaust port defined by the inflator housing transverse to and communicating with the combustion chamber;

a cylindrical exhaust sleeve extending from the piston into the combustion chamber and substantially sealing the at least one inflation gas exhaust port until the piston moves towards the propellant reservoir.

39. An airbag inflator according to claim 38 wherein the at least one gas exhaust port comprises a series of gas exhaust ports.

40. An airbag inflator according to claim 39 wherein the series of gas exhaust ports have varying sizes.

41. An airbag inflator according to claim 40 wherein the series of gas exhaust ports increase in size closer to the piston.

42. An airbag inflator according to claim 38 further comprising:

a coolant piston slidingly received within the inflator housing;

a coolant reservoir defined within the inflator housing by the coolant piston and the inflator housing;

at least one coolant injection port defined by the inflator housing communicating with the coolant reservoir; and coolant contained within the coolant reservoir;

the initiating means also for forcing the coolant piston against the coolant to force the coolant through the at least one coolant injection port.

43. An airbag inflator according to claim 42 further comprising:

a mixing chamber defined within the inflator housing communicating with the combustion chamber through the at least one inflation gas exhaust port and the coolant reservoir through the at least one coolant injection port; and at least one mixed gas exhaust port defined by the inflator housing and communicating with the mixing chamber.

* * * * *